United States Patent [19]

Eidenschink et al.

[11] 4,237,026
[45] Dec. 2, 1980

[54] LIQUID CRYSTALLINE CARBOXYLIC ACID ESTERS

[75] Inventors: Rudolf Eidenschink; Joachim Krause, both of Dieburg; Ludwig Pohl, Darmstadt, all of Fed. Rep. of Germany

[73] Assignee: Merck Patent Gesellschaft mit beschränkter Haftung, Darmstadt, Fed. Rep. of Germany

[21] Appl. No.: 100,599

[22] Filed: Dec. 5, 1979

[30] Foreign Application Priority Data

Dec. 13, 1978 [DE] Fed. Rep. of Germany ....... 2853728

[51] Int. Cl.³ .......................... C09K 3/34; C02F 1/13; C07C 121/64
[52] U.S. Cl. .............................. 252/299; 260/465 D; 350/350 R
[58] Field of Search .................. 260/465 D; 252/299; 350/350 R

[56] References Cited

U.S. PATENT DOCUMENTS

| | | | |
|---|---|---|---|
| 4,013,582 | 3/1977 | Gavrilovic | 252/299 |
| 4,029,595 | 6/1977 | Ross et al. | 252/299 |
| 4,073,742 | 2/1978 | Erdmann et al. | 252/299 |
| 4,130,502 | 12/1978 | Eidenschink et al. | 252/299 |
| 4,154,697 | 5/1979 | Eidenschink et al. | 252/299 |

*Primary Examiner*—Dolph H. Torrence
*Attorney, Agent, or Firm*—Millen & White

[57] ABSTRACT

Carboxylic acid esters of the formula

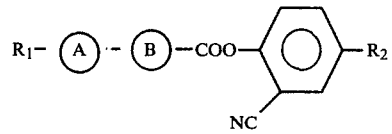

in which one of A or B is 1,4-disubstituted phenyl and the other is trans-1,4-disubstituted cyclohexane and $R_1$ and $R_2$ are independently each alkyl of 1-10 carbon atoms have liquid crystalline properties and are valuable components of liquid crystalline dielectrics.

8 Claims, No Drawings

LIQUID CRYSTALLINE CARBOXYLIC ACID ESTERS

BACKGROUND OF THE INVENTION

The present invention relates to liquid crystal carboxylic acid esters and their use for modifying the dielectric anisotropy (DCA) of liquid crystal dielectrics.

Liquid crystal dielectrics with a distinctly negative DCA are required for electrooptical display elements, the mode of action of which is based on the phenomenon of dynamic scattering or the deformation of aligned phases (DAP effect). The threshold voltage for the operation of such display elements becomes lower the more negative the DCA of the liquid crystal dielectric is. Another fundamental requirement for such dielectrics is that the nematic phase have a broad temperature range, which includes room temperature.

Among the liquid crystal base materials customarily used in practice for such dielectrics, which at the same time also possess the requisite chemical stability and as a rule are mixtures of two or more compounds from the classes of the azoxybenzenes, the phenyl benzoates, the phenyl thiobenzoates and the phenylcyclohexanes, there is none which has a markedly negative DCA. In order to produce liquid crystal dielectrics with a markedly negative DCA from such mixtures, liquid crystal compounds possessing a very highly negative DCA are added to these mixtures; preferably, the 4,4''-disubstituted 2''-cyanophenyl benzoyloxybenzoates according to German Pat. No. 2,240,864 or the p,p''-disubstituted 2''-cyanophenyl biphenylylcarboxylates according to German Offenlegungsschrift No. 2,613,293 (U.S. Pat. No. 4,073,742) are used as such liquid crystal compounds having a very highly negative DCA. However, it has been found that these compounds which lower the DCA either are not sufficiently soluble in the liquid crystal base materials to obtain a negative DCA of the desired magnitude or effect an undesired shift in the temperature range of the nematic phase. It is true that it is possible to a limited extent to circumvent the solubility problems by the use of several different DCA-modifying compounds and also to widen or correct the temperature range of the nematic phase, if this has been narrowed or shifted in an undesirable manner, by the addition of p,p''-disubstituted phenyl benzoyloxybenzoates according to German Offenlegungsschrift No. 2,139,628 (U.S. Pat. No. 4,002,670) or of p,p''-disubstituted phenyl biphenylylcarboxylates according to German Offenlegungsschrift No. 2,450,088 (U.S. Pat. No. 4,065,489). In all cases the liquid crystal dielectrics thus obtained are, however, multi-component mixtures, the production of which on a relatively large scale is very involved.

SUMMARY OF THE INVENTION

Accordingly, it is an object of this invention to provide liquid crystal dielectrics which have a distinctly negative DCA and as broad as possible a temperature range for the nematic phase, the said range including room temperature.

Upon further study of the specification and appended claims, further objects and advantages of this invention will become apparent to those skilled in the art.

These objects have been achieved by providing liquid crystal carboxylic acid esters of the Formula I

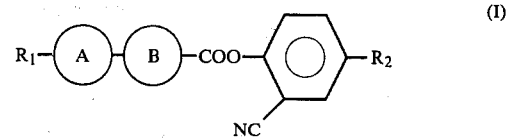

in which one of the rings A and B is a trans-1,4-disubstituted cyclohexane ring and the other is a 1,4-disubstituted phenyl ring and $R_1$ and $R_2$ are independently each alkyl of 1-10 carbon atims, which can be used as DCA-modifying components in liquid crystal dielectrics.

DETAILED DISCUSSION

Related liquid crystalline compounds are disclosed in copending application Ser. No. 001,084, filed on Jan. 5, 1979.

The compounds of Formula I possess a high negative DCA and, surprisingly, have a distinctly better solubility in the above-mentioned liquid crystalline base materials, and also in other liquid crystalline base materials, than do the esters of German Offenlegungsschrift No. 2,613,293, which are superficially analogous but in which all the rings are phenyl rings. As a result of these characteristics, it is possible to prepare liquid crystalline dielectrics with a markedly negative DCA from a smaller number of components, and thus with less effort, than heretofore possible.

The compounds of Formula I also broaden the temperature range of the nematic phase of the liquid crystalline base materials in such a way that, as a rule, the melting point is lowered and/or the clear point is markedly increased. Because of these characteristics, they can also be used to prepare dielectrics with a moderately high positive DCA and a broad temperature range of the nematic phase from liquid crystalline base materials with a highly positive DCA, for example, the cyanobiphenyls of German Offenlegungsschrift No. 2,356,085 (U.S. Pat. No. 3,947,375); such dielectrics are used in particular for display elements which operate on the basis of the Schadt-Helfrich effect in the twisted cell in multiplex mode.

The present invention thus relates to the liquid crystal carboxylic acid esters of Formula I and to processes for their preparation. The invention also relates to the use of compounds of Formula I for lowering the DCA of liquid crystal dielectrics and in particular for the preparation of such dielectrics having a markedly negative DCA. The invention also relates to liquid crystal dielectrics consisting of at least two liquid crystal components, of which at least one component is a compound of Formula I, and to electrooptical display elements which contain the dielectrics of this invention.

The compounds of this invention of Formula I are either 2-cyano-4-alkylphenyl 4-(4-alkylcyclohexyl)-benzoates of Formula Ia

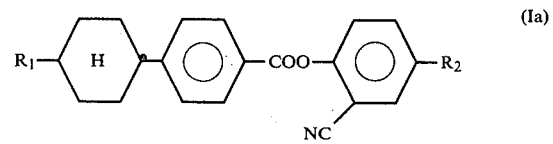

in which $R_1$ and $R_2$ are as defined for Formula I, or 2-cyano-4-alkylphenyl 4-(4-alkylphenyl)-cyclohexanecarboxylates of Formula Ib

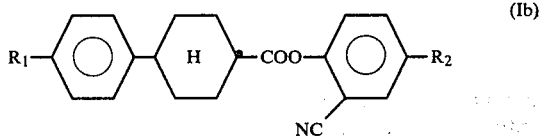

in which $R_1$ and $R_2$ are as defined for Formula I. In all the compounds of Formula I the cyclohexane ring is in the trans-1,4-disubstituted "chair" configuration; in the structural formulae this is indicated by the black marker point on the right-hand side of the cyclohexane ring.

As a rule, the compounds of Formula Ia have higher clear points than the compounds of Formula Ib. If the solubility and the achievable DCA are comparable for two compounds of Formulae Ia and Ib, the compounds of Formula Ia are preferred.

In the compounds of Formula I, the wing groups $R_1$ and $R_2$ are identical or, preferably, different. If they are alkyl groups with three or more carbon atoms, they can be stright-chain or branched. The compounds of Formula I which have the most advantageous properties are those in which at least one of the alkyl groups is straight-chain, that is to say methyl, ethyl, n-propyl, n-butyl, n-pentyl, n-hexyl, n-heptyl, n-octyl, n-nonyl or n-decyl. Furthermore, among these, the compounds in which the two alkyl groups together contain at least 3, preferably 4-16 and in particular 5-14 carbon atoms in total, are particularly valuable.

If a compound of Formula I contains a branched alkyl group, this preferably has only a single branch. For these, it has proved particularly advantageous if branching is in the 2- or 3-position of the alkyl group, counting from the cyclic moiety. The following are preferred branched alkyl groups: 2-methylpropyl, 2-methylbutyl, 3-methylbutyl, 2-methylpentyl, 3-methylpentyl, 2-methylhexyl, 2-ethylhexyl, 2-methylheptyl, 2-methyloctyl, 2-ethyloctyl and 2-methylnonyl.

The compounds of Formula I can be prepared using fully conventional methods. Preferably, a compound of Formula II

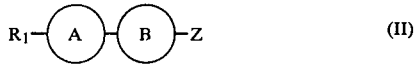

in which Z is COOH or a reactive derivative of the carboxyl group and A, B and $R_1$ are as defined for Formula I, is reacted at a temperature of $-50°$ C. to $+250°$ C., optionally in the presence of an organic solvent and/or of a conventional esterification catalyst, with a compound of Formula III

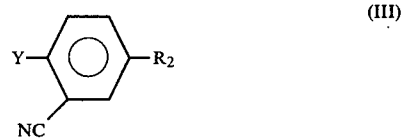

in which Y is OH or OMe, in which Me is one equivalent of a metal cation or an ammonium cation, and $R_2$ is as defined for Formula I.

Suitable reactive carboxyl group derivatives according to this invention include in particular —CO-halogen, especially —COCl, —COO-lower alkyl, for example, —COOCH$_3$, or an anhydride grouping, such as, for example, —COOCOCH$_3$. The OMe groups are preferably alkali metal phenolate or alkaline earth metal phenolate groups.

The reaction conditions for the process according to this invention are largely determined by the nature of the groups Z and Y in accordance with fully conventional considerations and/or routine experiments. Thus, a carboxylic acid is as a rule reacted with a phenol in the presence of a strong acid, for example, a mineral acid, such as hydrochloric acid or sulfuric acid. A preferred procedure is the reaction of an acid anhydride or, in particular, of an acid chloride with a phenol. These esterification reactions are preferably carried out in a basic medium, important bases including, in particular, alkali metal hydroxides, such as sodium hydroxide or potassium hydroxide, alkali metal carbonates and bicarbonates, such as sodium carbonate, sodium bicarbonate, potassium carbonate or potassium bicarbonate, alkali metal acetates, such as sodium acetate or potassium acetate, alkaline earth metal hydroxides, such as calcium hydroxide, or organic bases, such as triethylamine, pyridine, lutidine, collidine or quinoline.

The esterification reactions are advantageously carried out in the presence of an inert solvent. Solvents which are very suitable include, in particular, ethers, such as diethyl ether, di-n-butyl ether, tetrahydrofuran, dioxane or anisole; ketones, such as acetone, butanone, pentan-3-one or cyclohexanone; amides, such as dimethylformamide or hexamethylphosphoric acid triamide; hydrocarbons, such as benzene, toluene or xylene; halogenated hydrocarbons, such as carbon tetrachloride or tetrachloroethylene; and sulfoxides, such as dimethylsulfoxide or sulfolane. Water-immiscible solvents can at the same time advantageously be used for the removal, by azeotropic distillation, of the water formed during the esterification reaction. An excess of an organic base used as the catalyst, for example, pyridine, quinoline or triethylamine, can sometimes also be employed as the solvent for the esterification reaction. In principle, the esterification reactions according to the invention can also be carried out in the absence of a solvent, for example, by simply heating the components in the presence of sodium acetate.

The reaction temperature is usually $-50°$ C. to $+250°$ C. and preferably $-20°$ C. to $+80°$ C. At these temperatures, the esterification reactions as a rule have ended after 15 minutes to 48 hours.

A further preferred embodiment of the process of this invention comprises first converting a phenol of Formula III, which is to be esterified, to its sodium or potassium salt, for example, by treatment with ethanolic sodium hydroxide solution or potassium hydroxide solution, isolating this salt and suspending it together with sodium bicarbonate or potassium carbonate in acetone or diethyl ether, with stirring, and adding a solution of an acid chloride or anhydride of Formula II in diethyl ether, acetone or dimethylformamide dropwise to this suspension, with stirring. The reaction mixture is kept at a temperature of $-25°$ C. to $+20°$ C., preferably at $-10°$ C. to $-20°$ C. With this procedure, the esterification reaction usually has ended after 15 to 50 minutes.

Some of the starting materials for the process of this invention are described in the literature and the others can be prepared without difficulty using the methods disclosed, for example, in U.S. Pat. No. 4,130,502 or U.S. application Ser. No. 868,580, filed on Jan. 11, 1978, now allowed, whose disclosures are incorporated by reference herein. Of course, such starting materials must have the necessary trans-configuration in the cyclohexyl ring as required for the desired final compound of Formula I. Preparation of such starting materials is fully conventional.

The compounds of this invention generally themselves possess a nematic and/or smectic mesophase. However, their melting point is so high, usually above 50° C. and frequently even above 70° C., that they cannot be used alone as liquid crystal dielectrics for electro-optical display elements which are to be operated at room temperature. However, when the compounds of this inention are mixed with known liquid crystalline substances in amounts of 0.5 to 40 percent by weight (based on the total weight of the finished mixture), they effect a distinct lowering of the DCA value. Surprisingly, the viscosity of the dielectric to be prepared is only slightly increased, even when relatively large amounts of the compounds of this invention are added. Preferably, the compounds of this invention are mixed into the known base materials of liquid crystalline dielectrics in amounts of 1 to 50, and in particular of 5 to 40 percent by weight. The amount to be added will be determined by the desired value for the DCA or by the solubility of the compound or compounds of this invention added to the base material.

Suitable base materials which can be used for the liquid crystalline dielectrics of this invention include all base materials which have conventionally been used hitherto for the same purpose. The dielectrics, therefore, can contain not only liquid crystalline compounds but also those compounds which in themselves are not liquid crystals but are used in dielectrics to effect specific modifications. The most important liquid crystal compounds which can be used as base materials for the dielectrics of this invention can be characterized by Formula IV

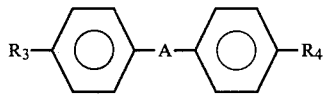
(IV)

wherein A is —CH=CH—, —CH=CX—, —CX=CH—, —C≡C—, —N=N—, —N(O)=N—, —N=N(O)—, —CO—O—, —O—CO—, —CO—S—, —S—CO—, —CH=N—, —N=CH—, —CH=N(O)—, —N(O)=CH— or a C—C single bond; when A is —CO—O, —O—CO— or a C—C single bond, one of the two phenyl rings can be replaced by a trans-1,4-disubstituted cyclohexane ring; X is CN or halogen, preferably Cl.

$R_3$ and $R_4$ are identical or different and are each alkyl, alkoxy, alkanoyl, alkanoyloxy or alkoxycarbonyloxy of up to 18 and preferably up to 8 carbon atoms. In most of these compounds, $R_3$ and $R_4$ are preferably different from one another and one is alkyl or alkoxy. Furthermore, in each case, one of $R_3$ and $R_4$ can also be —CN, —NC or —NO$_2$. A large number of such liquid crystal compounds are available commercially.

By means of additives other than those of Formula I, the dielectrics of this invention can be so modified that they can be used in all of the conventional liquid crystal display elements disclosed hitherto. Such additives are known to those skilled in the art and are described in detail in the pertinent literature. For example, substances for changing the orientation or the conductivity and/or increasing the chemical or photochemical stability can be added. Such substances are described, for example, in German Offenlegungsschriften Nos. 2,209,127 (United Kingdom Pat. No. 1,376,115), 2,160,788 and 2,611,453 (U.S. Pat. No. 4,077,900). The optional presence of such substances is covered by the above term "base materials" used to describe one constituent of the dielectrics of this invention.

The dielectrics of this invention are prepared in a manner which is in itself fully conventional. As a rule, the desired amount of one or more compounds of Formula I is dissolved in the known liquid crystal substance, preferably at elevated temperature. If a temperature above the clear point of the base material is chosen, it is particularly easy to observe when the dissolving process has gone to completion. It is, however, also possible to add a solution of a compound of Formula I in a suitable organic solvent, for example, acetone, chloroform or methanol, to the base material and, after thorough mixing, to remove the solvent again, for example, by distillation under reduced pressure. Of course, with this procedure care must be taken that no further doping agents, which under certain circumstances are undesired, are carried in by the solvent.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, all temperatures are set forth uncorrected in degrees Celsius; unless otherwise indicated, all parts and percentages are by weight.

In the physical data, m.p. denotes the melting point of a substance, i.e., the temperature at which the transition from a solid, crystalline phase to a liquid isotropic or liquid crystal phase takes place, it being possible for the latter phase to be smectic or nematic. S./N. denotes the transition point from a smectic to a nematic phase and Cl. denotes the clear point of the liquid crystal substance, i.e., the temperature at which a liquid crystal phase is converted to an isotropic liquid phase (or vice versa).

EXAMPLE 1

24.7 g of 4-(trans-4-n-pentylcyclohexyl)-benzoic acid in 48 g of thionyl chloride is heated at the boil for 2 hours. The excess thionyl chloride is distilled off and the residue is taken up in 150 ml of toluene. A solution of 21.7 g of 2-cyano-4-n-heptylphenol in 150 ml of toluene and the reaction mixture is warmed at 80° C. for 5 hours. After cooling, the reaction mixture is poured into 500 ml of water. The organic phase is separated off, washed twice with 200 ml of 2 N hydrochloric acid and twice with 100 ml of water and then dried over sodium sulfate. After distilling off the toluene, the residual 2-cyano-4-n-heptylphenyl 4-(trans-4-n-pentylcyclohexyl)-benzoate is recrystallized from ethanol; m.p. 49.5° C. Cl. 114.5° C.

The following compounds wherein the cyclohexyl group in each case is in the trans-configuration are prepared analogously:

2-cyano-4-methylphenyl 4-(4-methylcyclohexyl)-benzoate, 2-cyano-4-methylphenyl 4-(4-ethylcyclohexyl)-benzoate, 2-cyano-4-methylphenyl 4-(4-n-propylcyclohexyl)-benzoate,
2-cyano-4-methylphenyl 4-(4-n-butylcyclohexyl)-benzoate,
2-cyano-4-methylphenyl 4-(4-n-pentylcyclohexyl)-benzoate,
2-cyano-4-methylphenyl 4-(4-n-hexylcyclohexyl)-benzoate,
2-cyano-4-methylphenyl 4-(4-n-heptylcyclohexyl)-benzoate,
2-cyano-4-methylphenyl 4-(4-n-octylcyclohexyl)-benzoate,
2-cyano-4-methylphenyl 4-(4-n-nonylcyclohexyl)-benzoate,
2-cyano-4-methylphenyl 4-(4-n-decylcyclohexyl)-benzoate,
2-cyano-4-methylphenyl 4-[4-(2-methylbutyl)-cyclohexyl]-benzoate,
4-cyano-4-methylphenyl 4-[4-(3-methylbutyl)-cyclohexyl]-benzoate,
2-cyano-4-methylphenyl 4-[4-(1-methylpentyl)-cyclohexyl]-benzoate,
2-cyano-4-methylphenyl 4-[4-(2-ethylhexyl)-cyclohexyl]-benzoate,
2-cyano-4-ethylphenyl 4-(4-methylcyclohexyl)-benzoate,
2-cyano-4-ethylphenyl 4-(4-ethylcyclohexyl)-benzoate,
2-cyano-4-ethylphenyl 4-(4-n-propylcyclohexyl)-benzoate, m.p. 68° C., Cl. 63.5° C.,
2-cyano-4-ethylphenyl 4-(4-n-butylcyclohexyl)-benzoate, m.p. 61.5° C., Cl. 103° C.,
2-cyano-4-ethylphenyl 4-(4-n-pentylcyclohexyl)-benzoate, m.p. 62.3° C., Cl. 112.6° C.,
2-cyano-4-ethylphenyl 4-(4-n-hexylcyclohexyl)-benzoate,
2-cyano-4-ethylphenyl 4-(4-n-heptylcyclohexyl)-benzoate,
2-cyano-4-ethylphenyl 4-(4-n-octylcyclohexyl)-benzoate,
2-cyano-4-ethylphenyl 4-(4-n-nonylcyclohexyl)-benzoate,
2-cyano-4-ethylphenyl 4-(4-n-decylcyclohexyl)-benzoate,
2-cyano-4-ethylphenyl 4-[4-(2-methylbutyl)-cyclohexyl]-benzoate,
2-cyano-4-ethylphenyl 4-[4-(3-methylbutyl)-cyclohexyl]-benzoate,
2-cyano-4-ethylphenyl 4-[4-(1-methylpentyl)-cyclohexyl]-benzoate,
2-cyano-4-ethylphenyl 4-[4-(2-ethylhexyl)-cyclohexyl]-benzoate,
2-cyano-4-n-propylphenyl 4-(4-methylcyclohexyl)-benzoate,
2-cyano-4-n-propylphenyl 4-(4-ethylcyclohexyl)-benzoate,
2-cyano-4-n-propylphenyl 4-(4-n-propylcyclophexyl)-benzoate, m.p. 87.3° C., Cl. 119° C.,
2-cyano-4-n-propylphenyl 4-(4-n-butylcyclohexyl)-benzoate, m.p. 72° C., Cl. 113° C.,
2-cyano-4-n-propylphenyl 4-(4-n-pentylcyclohexyl)-benzoate,
2-cyano-4-n-propylphenyl 4-(4-n-hexylcyclohexyl)-benzoate,
2-cyano-4-n-propylphenyl 4-(4-n-heptylcyclohexyl)-benzoate,
2-cyano-4-n-propylphenyl 4-(4-n-octylcyclohexyl)-benzoate,
2-cyano-4-n-propylphenyl 4-(4-n-nonylcyclohexyl)-benzoate,
2-cyano-4-n-propylphenyl 4-(4-n-decylcyclohexyl)-benzoate,
2-cyano-4-n-propylphenyl 4-[4-(2-methylbutyl)-cyclohexyl]-benzoate,
2-cyano-4-n-propylphenyl 4-[4-(3-methylbutyl)-cyclohexyl]-benzoate,
2-cyano-4-n-propylphenyl 4-[4-(1-methylpentyl)-cyclohexyl]-benzoate,
2-cyano-4-n-propylphenyl 4-[4-(2-ethylhexyl)-cyclohexyl]-benzoate,
2-cyano-4-n-butylphenyl 4-(4-methylcyclohexyl)-benzoate,
2-cyano-4-n-butylphenyl 4-(4-ethylcyclohexyl)-benzoate,
2-cyano-4-n-butylphenyl 4-(4-n-propylcyclohexyl)-benzoate, m.p. 56° C., Cl. 113° C.,
2-cyano-4-n-butylphenyl 4-(4-n-butylcyclohexyl)-benzoate, m.p. 60° C., Cl. 108° C.,
2-cyano-4-n-butylphenyl 4-(4-n-pentylcyclohexyl)-benzoate, m.p. 50° C., Cl. 115° C.,
2-cyano-4-n-butylphenyl 4-(4-n-hexylcyclohexyl)-benzoate,
2-cyano-4-n-butylphenyl 4-(4-n-heptylcyclohexyl)-benzoate,
2-cyano-4-n-butylphenyl 4-(4-n-ocutylcyclohexyl)-benzoate,
2-cyano-4-n-butylphenyl 4-(4-n-nonylcyclohexyl)-benzoate,
2-cyano-4-n-butylphenyl 4-(4-n-decylcyclohexyl)-benzoate
2-cyano-4-n-butylphenyl 4-[4-(2-methylbutyl)-cyclohexyl]-benzoate,
2-cyano-4-n-butylphenyl 4-[4-(3-methylbutyl)-cyclohexyl]-benzoate,
2-cyano-4-n-butylphenyl 4-[4-(1-methylpentyl)-cyclohexyl]-benzoate,
2-cyano-4-n-butylphenyl 4-[4-(2-ethylhexyl)-cyclohexyl]-benzoate,
2-cyano-4-n-pentylphenyl 4-(4-methylcyclohexyl)-benzoate,
2-cyano-4-n-pentylphenyl 4-(4-ethylcyclohexyl)-benzoate,
2-cyano-4-n-pentylphenyl 4-(4-n-propylcyclohexyl)-benzoate, m.p. 57° C., Cl. 111° C.,
2-cyano-4-n-pentylphenyl 4-(4-n-butylcyclohexyl)-benzoate, m.p. 54° C., Cl. 107° C.,
2-cyano-4-n-pentylphenyl 4-(4-n-pentylcyclohexyl)-benzoate, m.p. 59° C., Cl. 113° C.,
2-cyano-4-n-pentylphenyl 4-(4-n-hexylcyclohexyl)-benzoate,
2-cyano-4-n-pentylphenyl 4-(4-n-heptylcyclohexyl)-benzoate,
2-cyano-4-n-pentylphenyl 4-(4-n-octylcyclohexyl)-benzoate,
2-cyano-4-n-pentylphenyl 4-(4-n-nonylcyclohexyl)-benzoate,
2-cyano-4-n-pentylphenyl 4-(4-n-decylcyclohexyl)-benzoate,
2-cyano-4-n-pentylphenyl 4-[4-(2-methylbutyl)-cyclohexyl]-benzoate,
2-cyano-4-n-pentylphenyl 4-[4-(3-methylbutyl)-cyclohexyl]-benzoate,
2-cyano-4-n-pentylphenyl 4-[4-(1-methylpentyl)-cyclohexyl]-benzoate,
2-cyano-4-n-pentylphenyl 4-[4-(2-ethylhexyl)-cyclohexyl]-benzoate, 2-cyano-4-n-hexylphenyl 4-(4-methylcyclohexyl)-benzoate,
2-cyano-4-n-hexylphenyl 4-(4-ethylcyclohexyl)-benzoate,
2-cyano-4-n-hexylphenyl 4-(4-n-propylcyclohexyl)-benzoate,
2-cyano-4-n-hexylphenyl 4-(4-n-butylcyclohexyl)-benzoate,
2-cyano-4-n-hexylphenyl 4-(4-n-pentylcyclohexyl)-benzoate,
2-cyano-4-n-hexylphenyl 4-(4-n-hexylcyclohexyl)-benzoate,
2-cyano-4-n-hexylphenyl 4-(4-n-heptylcyclohexyl)-benzoate,
2-cyano-4-n-hexylphenyl 4-(4-n-octylcyclohexyl)-benzoate,
2-cyano-4-n-hexylphenyl 4-(4-n-nonylcyclohexyl)-benzoate,
2-cyano-4-n-hexylphenyl 4-(4-n-decylcyclohexyl)-benzoate,
2-cyano-4-hexylphenyl 4-[4-(2-methylbutyl)-cyclohexyl]-benzoate,
2-cyano-4-n-hexylphenyl 4-[4-(3-methylbutyl)-cyclohexyl]-benzoate,
2-cyano-4-n-hexylphenyl 4-[4-(1-methylpentyl)-cyclohexyl]-benzoate,
2-cyano-4-n-hexylphenyl 4-[4-(2-ethylhexyl)-cyclohexyl]-benzoate,
2-cyano-4-n-heptylphenyl 4-(4-methylcyclohexyl)-benzoate,
2-cyano-4-n-heptylphenyl 4-(4-ethylcyclohexyl)-benzoate,
2-cyano-4-n-heptylphenyl 4-(4-n-propylcyclohexyl)-benzoate, m.p. 60° C., Cl. 111° C.,
2-cyano-4-n-heptylphenyl 4-(4-n-butylcyclohexyl)-benzoate, m.p. 48° C., Cl. 108.5°,
2-cyano-4-n-heptylphenyl 4-(4-n-hexylcyclohexyl)-benzoate,
2-cyano-4-n-heptylphenyl 4-(4-n-heptylcyclohexyl)-benzoate, m.p. 58°, Cl. 110.5°,
2-cyano-4-n-heptylphenyl 4-(4-n-octylcyclohexyl)-benzoate,
2-cyano-4-n-heptylphenyl 4-(4-n-nonylcyclohexyl)-benzoate,
2-cyano-4-n-heptylphenyl 4-(4-n-decylcyclohexyl)-benzoate,
2-cyano-4-n-heptylphenyl 4-[4-(2-methylbutyl)-cyclohexyl]-benzoate,
2-cyano-4-n-heptylphenyl 4-[4-(3-methylbutyl)-cyclohexyl]-benzoate,
2-cyano-4-n-heptylphenyl 4-[4-(1-methylpentyl)-cyclohexyl]-benzoate,
2-cyano-4-n-heptylphenyl 4-[4-(2-ethylhexyl)-cyclohexyl]-benzoate,
2-cyano-4-n-octylphenyl 4-(4-methylcyclohexyl)-benzoate,
2-cyano-4-n-octylphenyl 4-(4-ethylcyclohexyl)-benzoate,
2-cyano-4-n-octylphenyl 4-(4-n-propylcyclohexyl)-benzoate,
2-cyano-4-n-octylphenyl 4-(4-n-butylcyclohexyl)-benzoate,
2-cyano-4-octylphenyl 4-(4-n-pentylcyclohexyl)-benzoate,
2-cyano-4-n-octylphenyl 4-(4-n-hexylcyclohexyl)-benzoate,
2-cyano-4-n-octylphenyl 4-(4-n-heptylcyclohexyl)-benzoate,
2-cyano-4-n-octylphenyl 4-(4-n-octylcyclohexyl)-benzoate,
2-cyano-4-n-octylphenyl 4-(4-n-nonylcyclohexyl)-benzoate,
2-cyano-4-n-octylphenyl 4-(4-n-decylcyclohexyl)-benzoate,
2-cyano-4-n-octylphenyl 4-[4-(2-methylbutyl)-cyclohexyl]-benzoate,
2-cyano-4-n-octylphenyl 4-[4-(3-methylbutyl)-cyclohexyl]-benzoate,
2-cyano-4-n-octylphenyl 4-[4-(1-methylpentyl)-cyclohexyl]-benzoate,
2-cyano-4-n-octylphenyl 4-[4-(2-ethylhexyl)-cyclohexyl]-benzoate,
2-cyano-4-n-nonylphenyl 4-(4-methylcyclohexyl)-benzoate,
2-cyano-4-n-nonylphenyl 4-(4-ethylcyclohexyl)-benzoate,
2-cyano-4-n-nonylphenyl 4-(4-n-propylcyclohexyl)-benzoate,
2-cyano-4-n-nonylphenyl 4-(4-n-butylcyclohexyl)-benzoate,
2-cyano-4-n-nonylphenyl 4-(4-n-pentylcyclohexyl)-benzoate,
2-cyano-4-n-nonylphenyl 4-(4-n-hexylcyclohexyl)-benzoate,
2-cyano-4-n-nonylphenyl 4-(4-n-heptylcyclohexyl)-benzoate,
2-cyano-4-n-nonylphenyl 4-(4-n-octylcyclohexyl)-benzoate,
2-cyano-4-n-nonylphenyl 4-(4-n-nonylcyclohexyl)-benzoate,
2-cyano-4-n-nonylphenyl 4-(4-n-decylcyclohexyl)-benzoate,
2-cyano-4-n-nonylphenyl 4-[4-(2-methylbutyl)-cyclohexyl]-benzoate,
2-cyano-4-n-nonylphenyl 4-[4-(3-methylbutyl)-cyclohexyl]-benzoate,
2-cyano-4-n-nonylphenyl 4-[4-(1-methylpentyl)-cyclohexyl]-benzoate,
2-cyano-4-n-nonylphenyl 4-[4-(2-ethylhexyl)-cyclohexyl]-benzoate,
2-cyano-4-n-decylphenyl 4-(4-methylcyclohexyl)-benzoate,
2-cyano-4-n-decylphenyl 4-(4-ethylcyclohexyl)-benzoate,
2-cyano-4-n-decylphenyl 4-(4-n-propylcyclohexyl)-benzoate,
2-cyano-4-n-decylphenyl 4-(4-n-butylcyclohexyl)-benzoate,
2-cyano-4-n-decylphenyl 4-(4-n-pentylcyclohexyl)-benzoate,
2-cyano-4-n-decylphenyl 4-(4-n-hexylcyclohexyl)-benzoate,
2-cyano-4-n-decylphenyl 4-(4-n-heptylcyclohexyl)-benzoate,
2-cyano-4-n-decylphenyl 4-(4-n-octylcyclohexyl)-benzoate,
2-cyano-4-n-decylphenyl 4-(4-n-nonylcyclohexyl)-benzoate,
2-cyano-4-n-decylphenyl 4-(4-n-decylcyclohexyl)-benzoate,
2-cyano-4-n-decylphenyl 4-[4-(2-methylbutyl)-cyclohexyl]-benzoate,
2-cyano-4-n-decylphenyl 4-[4-(3-methylbutyl)-cyclohexyl]-benzoate,
2-cyano-4-n-decylphenyl 4-[4-(1-methylpentyl)-cyclohexyl]-benzoate, 2-cyano-4-n-decylphenyl 4-[4-(2-ethylhexyl)-cyclohexyl]-benzoate,
2-cyano-4-(2-methylbutyl)-phenyl 4-(4-methylcyclohexyl)-benzoate,
2-cyano-4-(2-methylbutyl)-phenyl 4-(4-ethylcyclohexyl)-benzoate,
2-cyano-4-(2-methylbutyl)-phenyl 4-(4-n-propylcyclohexyl)-benzoate,
2-cyano-4-(2-methylbutyl)-phenyl 4-(4-n-butylcyclohexyl)-benzoate,
2-cyano-4-(2-methylbutyl)-phenyl 4-(4-n-pentylcyclohexyl)-benzoate,
2-cyano-4-(2-methylbutyl)-phenyl 4-(4-n-hexylcyclohexyl)-benzoate,
2-cyano-4-(2-methylbutyl)-phenyl 4-(4-n-heptylcyclohexyl)-benzoate,
2-cyano-4-(2-methylbutyl)-phenyl 4-(4-n-octylcyclohexyl)-benzoate,
2-cyano-4-(2-methylbutyl)-phenyl 4-(4-n-nonylcyclohexyl)-benzoate,
2-cyano-4-(2-methylbutyl)-phenyl 4-(4-n-decylcyclohexyl)-benzoate,
2-cyano-4-(3-methylbutyl)-phenyl 4-(4-methylcyclohexyl)-benzoate,
2-cyano-4-(3-methylbutyl)-phenyl 4-(4-ethylcyclohexyl)-benzoate,
2-cyano-4-(3-methylbutyl)-phenyl 4-(4-n-propylcyclohexyl)-benzoate,
2-cyano-4-(3-methylbutyl)-phenyl 4-(4-n-butylcyclohexyl)-benzoate,
2-cyano-4-(3-methylbutyl)-phenyl 4-(4-n-pentylcyclohexyl)-benzoate,
2-cyano-4-(3-methylbutyl)-phenyl 4-(4-n-hexylcyclohexyl)-benzoate,
2-cyano-4-(3-methylbutyl)-phenyl 4-(4-n-heptylcyclohexyl)-benzoate,
2-cyano-4-(3-methylbutyl)-phenyl 4-(4-n-octylcyclohexyl)-benzoate,
2-cyano-4-(3-methylbutyl)-phenyl 4-(4-n-nonylcyclohexyl)-benzoate,
2-cyano-4-(3-methylbutyl)-phenyl 4-(4-n-decylcyclohexyl)-benzoate,
2-cyano-4-(1-methylpentyl)-phenyl 4-(4-methylcyclohexyl)-benzoate,
2-cyano-4-(1-methylpentyl)-phenyl 4-(4-ethylcyclohexyl)-benzoate,
2-cyano-4-(1-methylpentyl)-phenyl 4-(4-n-propylcyclohexyl)-benzoate,
2-cyano-4-(1-methylpentyl)-phenyl 4-(4-n-butylcyclohexyl)-benzoate,
2-cyano-4-(1-methylpentyl)-phenyl 4-(4-n-pentylcyclohexyl)-benzoate,
2-cyano-4-(1-methylpentyl)-phenyl 4-(4-n-hexylcyclohexyl)-benzoate,
2-cyano-4-(1-methylpentyl)-phenyl 4-(4-n-heptylcyclohexyl)-benzoate,
2-cyano-4-(1-methylphenyl)-phenyl 4-(4-n-octylcyclohexyl)-benzoate,
2-cyano-4-(1-methylphenyl)-phenyl 4-(4-n-nonylcyclohexyl)-benzoate,
2-cyano-4-(1-methylphenyl)-phenyl 4-(4-n-decylcyclohexyl)-benzoate,
2-cyano-4-(2-methylpropyl)-phenyl 4-(4-methylcyclohexyl)-benzoate,
2-cyano-4-(2-methylpropyl)-phenyl 4-(4-ethylcyclohexyl)-benzoate,
2-cyano-4-(2-methylpropyl)-phenyl 4-(4-n-propylcyclohexyl)-benzoate,
2-cyano-4-(2-methylpropyl)-phenyl 4-(4-n-butylcyclohexyl)-benzoate,
2-cyano-4-(2-methylpropyl)-phenyl 4-(4-n-pentylcyclohexyl)-benzoate,
2-cyano-4-(2-methylpropyl)-phenyl 4-(4-n-hexylcyclohexyl)-benzoate,
2-cyano-4-(2-methylpropyl)-phenyl 4-(4-n-heptylcyclohexyl)-benzoate,
2-cyano-4-(2-methylpropyl)-phenyl 4-(4-n-octylcyclohexyl)-benzoate,
2-cyano-4-(2-methylpropyl)-phenyl 4-(4-n-nonylcyclohexyl)-benzoate and
2-cyano-4-(2-methylpropyl)-phenyl 4-(4-n-decylcyclohexyl)-benzoate.

EXAMPLE 2

(a) A solution of 233 g of valeric acid chloride in 300 ml of methylene chloride is introduced into a suspension of 568 g of anhydrous aluminum chloride in 600 ml of methylene chloride, at $-10°$ C. to $-5°$ C., with stirring. A solution of 390 g of trans-4-acetyl-1-phenylcyclohexane in 500 ml of methylene chloride is then added at $-10°$ C. The reaction mixture is stirred for an additional 1 hour at $-10°$ C. and is then pouredinto 10 liters of ice-water. The organic phase is separated off, washed several times with water, dried and evaporated. The residual 4-(trans-4-acetylcyclohexyl)-valerophenone is recrystallized from petroleum benzine (b.p. 50°–70° C.); m.p. 74°–76° C.

(b) 407 g of 4-(trans-4-acetylcyclohexyl)-valerophenone is dissolved in 2.5 liters of ethanol and hydrogenated in the presence of 25 g of palladium-on-active charcoal catalyst (10% by weight of Pd) at room temperature and normal pressure. The catalyst is then filtered off, the filtrate is evaporated and the residual 4-(trans-4-acetylcyclohexyl)-1-n-pentylbenzene is recrystallized from ethanol; m.p. 29°–31° C.

(c) A solution of 225 g of 4-(trans-4-acetylcyclohexyl)-1-n-pentylbenzene in 2.7 liters of dioxane is introduced into a solution of 396 g of bromine and 327 g of sodium hydroxide in 1.6 liters of water at 15° C. The resulting suspension is stirred for an additional 5 hours at room temperature and 6 liters of diethyl ether are then added. The organic phase is separated off and washed twice with 2 liters of water. The combined aqueous phases are neutralized with 2 N hydrochloric acid; the 4-trans-(4-n-pentylphenyl)-cyclohexanecarboxylic acid which then precipitates is filtered off, washed with water and recrystallized from ethanol; m.p. 185° C. Cl. 196° C.

(d) 24.7 g of 4-trans-(4-n-pentylphenyl)-cyclohexanecarboxylic acid is converted analogously to EXAMPLE 1 to 4-trans-(4-n-pentylphenyl)-cyclohexanecarboxylic acid chloride and the latter is esterified in toluene in the presence of pyridine with 17.5 g of 2-cyano-4-n-butyl-phenol. After working up, which is carried out as in EXAMPLE 1, the residual 2-cyano-4-n-butylphenyl 4-trans-(4-n-pentylphenyl)-cyclohexanecarboxylate is recrystallized from ethanol; m.p. 51° C., Cl. 50.5° C.

The following compounds are prepared analogously:
2-cyano-4-methylphenyl 4-trans-(4-methylphenyl)-cyclohexanecarboxylate,
2-cyano-4-methylphenyl 4-trans-(4-ethylphenyl)-cyclohexanecarboxylate,
2-cyano-4-methylphenyl 4-trans-(4-n-propylphenyl)-cyclohexanecarboxylate,
2-cyano-4-methylphenyl 4-trans-(4-n-butylphenyl)-cyclohexanecarboxylate, 2-cyano-4-methylphenyl 4-trans-(4-n-pentylphenyl)-cyclohexanecarboxylate,
2-cyano-4-methylphenyl 4-trans-(4-n-hexylphenyl)-cyclohexanecarboxylate,
2-cyano-4-methylphenyl 4-trans-(4-n-heptylphenyl)-cyclohexanecarboxylate,
2-cyano-4-methylphenyl 4-trans-(4-n-octylphenyl)-cyclohexanecarboxylate,
2-cyano-4-methylphenyl 4-trans-(4-n-octylphenyl)-cyclohexanecarboxylate,
2-cyano-4-methylphenyl 4-trans-(4-n-decylphenyl)-cyclohexanecarboxylate,
2-cyano-4-methylphenyl 4-trans-[4-(2-methylpropyl)-phenyl]-cyclohexanecarboxylate,
2-cyano-4-methylphenyl 4-trans-[4-(2-methylbutyl)-phenyl]-cyclohexanecarboxylate,
2-cyano-4-methylphenyl 4-trans-[4-(3-methylbutyl)-phenyl]-cyclohexanecarboxylate,
2-cyano-4-methylphenyl 4-trans-[4-(2-methylheptyl)-phenyl]-
2-cyano-4-ethylphenyl 4-trans-(4-methylphenyl)-cyclohexanecarboxylate,
2-cyano-4-ethylphenyl 4-trans-(4-ethylphenyl)-cyclohexanecarboxylate,
2-cyano-4-ethylphenyl 4-trans-(4-n-propylphenyl)-cyclohexanecarboxylate,
2-cyano-4-ethylphenyl 4-trans-(4-n-butylphenyl)-cyclohexanecarboxylate,
2-cyano-4-ethylphenyl 4-trans-(4-n-pentylphenyl)-cyclohexanecarboxylate,
2-cyano-4-ethylphenyl 4-trans-(4-n-hexylphenyl)-cyclohexanecarboxylate,
2-cyano-4-ethylphenyl 4-trans-(4-n-heptylphenyl)-cyclohexanecarboxylate,
2-cyano-4-ethylphenyl 4-trans-(4-n-octylphenyl)-cyclohexanecarboxylate,
2-cyano-4-ethylphenyl 4-trans-(b 4-n-nonylphenyl)-cyclohexanecarboxylate,
2-cyano-4-ethylphenyl 4-trans-(4-n-decylphenyl)-cyclohexanecarboxylate,
2-cyano-4-ethylphenyl 4-trans-[4-(2-methylpropyl)-phenyl]-cyclohexanecarboxylate,
2-cyano-4-ethylphenyl 4-trans-[4-(2-methylbutyl)-phenyl]-cyclohexanecarboxylate,
2-cyano-4-ethylphenyl 4-trans-[4-(3-methylbutyl)-phenyl]-cyclohexanecarboxylate,
2-cyano-4-ethylphenyl 4-trans-[4-(2-methylheptyl)-phenyl]-cyclohexanecarboxylate,
2-cyano-4-n-propylphenyl 4-trans-(4-methylphenyl)-cyclohexanecarboxylate,
2-cyano-4-n-propylphenyl 4-trans-(4-ethylphenyl)-cyclohexanecarboxylate,
2-cyano-4-n-propylphenyl 4-trans-(4-n-propylphenyl)-cyclohexanecarboxylate,
2-cyano-4-n-propylphenyl 4-trans-(4-n-butylphenyl)-cyclohexanecarboxylate,
2-cyano-4-n-propylphenyl 4-trans-(4-n-pentylphenyl)-cyclohexanecarboxylate,
2-cyano-4-n-propylphenyl 4-trans-(4-n-hexylphenyl)-cyclohexanecarboxylate,
2-cyano-4-n-propylphenyl 4-trans-(4-n-heptylphenyl)-cyclohexanecarboxylate,
2-cyano-4-n-propylphenyl 4-trans-(4-n-octylphenyl)-cyclohexanecarboxylate,
2-cyano-4-n-propylphenyl 4-trans-(4-n-nonylphenyl)-cyclohexanecarboxylate,
2-cyano-4-n-propylphenyl 4-trans-(4-n-decylphenyl)-cyclohexanecarboxylate,
2-cyano-4-n-propylphenyl 4-trans-[4-(2-methylpropyl)-phenyl]-cyclohexanecarboxylate,
2-cyano-4-n-propylphenyl 4-trans-[4-(2-methylbutyl)-phenyl]-cyclohexanecarboxylate,
2-cyano-4-n-propylphenyl 4-trans-[4-(3-methylbutyl)-phenyl]-cyclohexanecarboxylate,
2-cyano-4-n-propylphenyl 4-trans-[4-(2-methylheptyl)-phenyl]-cyclohexanecarboxylate,
2-cyano-4-n-butylphenyl 4-trans-(4-methylphenyl)-cyclohexanecarboxylate.
2-cyano-4-n-butylphenyl 4-trans-(4-ethylphenyl)-cyclohexanecarboxylate,
2-cyano-4-n-butylphenyl 4-trans-(4-n-propylphenyl)-cyclohexanecarboxylate,
2-cyano-4-n-butylphenyl 4-trans-(4-n-butylphenyl)-cyclohexanecarboxylate,
2-cyano-4-n-butylphenyl 4-trans-(4-n-hexylphenyl)-cyclohexanecarboxylate,
2-cyano-4-n-butylphenyl 4-trans-(4-n-heptylphenyl)-cyclohexanecarboxylate,
2-cyano-4-n-butylphenyl 4-trans-(4-n-octylphenyl)-cyclohexanecarboxylate,
2-cyano-4-n-butylphenyl 4-trans-(4-n-nonylphenyl)-cyclohexanecarboxylate,
2-cyano-4-n-butylphenyl 4-trans-(4-n-decylphenyl)-cyclohexanecarboxylate,
2-cyano-4-n-butylphenyl 4-trans-[4-(2-methylpropyl)-phenyl]-cyclohexanecarboxylate,
2-cyano-4-n-butylphenyl 4-trans-[4-(2-methylbutyl)-phenyl]-cyclohexanecarboxylate,
2-cyano-4-n-butylphenyl 4-trans-[4-(3-methylbutyl)-phenyl]-cyclohexanecarboxylate,
2-cyano-4-n-butylphenyl 4-trans-[4-(2-methylheptyl)-phenyl]-cyclohexanecarboxylate,
2-cyano-4-n-pentylphenyl 4-trans-(4-methylphenyl)-cyclohexanecarboxylate,
2-cyano-4-n-pentylphenyl 4-trans-(4-ethylphenyl)-cyclohexanecarboxylate,
2-cyano-4-n-pentylphenyl 4-trans-(4-n-propylphenyl)-cyclohexanecarboxylate,
2-cyano-4-n-pentylphenyl 4-trans-(4-n-butylphenyl)-cyclohexanecarboxylate,
2-cyano-4-n-pentylphenyl 4-trans-(4-n-pentylphenyl)-cyclohexanecarboxylate,
2-cyano-4-n-pentylphenyl 4-trans-(4-n-hexylphenyl)-cyclohexanecarboxylate,
2-cyano-4-n-pentylphenyl 4-trans-(4-n-heptylphenyl)-cyclohexanecarboxylate,
2-cyano-4-n-pentylphenyl 4-trans-(4-n-octylphenyl)-cyclohexanecarboxylate,
2-cyano-4-n-pentylphenyl 4-trans-(4-n-nonylphenyl)-cyclohexanecarboxylate,
2-cyano-4-n-pentylphenyl 4-trans-(4-n-decylphenyl)-cyclohexanecarboxylate,
2-cyano-4-n-pentylphenyl 4-trans-[4-(2-methylpropyl)-phenyl]-cyclohexanecarboxylate,
2-cyano-4-n-pentylphenyl 4-trans-[4-(2-methylbutyl)-phenyl]-cyclohexanecarboxylate,
2-cyano-4-n-pentylphenyl 4-trans-[4-(3-methylbutyl)-phenyl]-cyclohexanecarboxylate,
2-cyano-4-n-pentylphenyl 4-trans-[4-(2-methylheptyl)-phenyl]-cyclohexanecarboxylate,
2-cyano-4-n-hexylphenyl 4-trans-(4-methylphenyl)-cyclohexanecarboxylate,
2-cyano-4-n-hexylphenyl 4-trans-(4-ethylphenyl)-cyclohexanecarboxylate,
2-cyano-4-n-hexylphenyl 4-trans-(4-n-propylphenyl)-cyclohexanecarboxylate, 2-cyano-4-n-hexylphenyl 4-trans-(4-n-butylphenyl)-cyclohexanecarboxylate,
2-cyano-4-n-hexylphenyl 4-trans-(4-n-pentylphenyl)-cyclohexanecarboxylate,
2-cyano-4-n-hexylphenyl 4-trans-(4-n-hexylphenyl)-cyclohexanecarboxylate,
2-cyano-4-n-hexylphenyl 4-trans-(4-n-heptylphenyl)-cyclohexanecarboxylate,
2-cyano-4-n-hexylphenyl 4-trans-(4-n-octylphenyl)-cyclohexanecarboxylate,
2-cyano-4-n-hexylphenyl 4-trans-(4-n-nonylphenyl)-cyclohexanecarboxylate,
2-cyano-4-n-hexylphenyl 4-trans-(4-n-decylphenyl)-cyclohexanecarboxylate,
2-cyano-4-n-hexylphenyl 4-trans-[4-(2-methylpropyl)-phenyl]-cyclohexanecarboxylate,
2-cyano-4-n-hexylphenyl 4-trans-[4-(2-methylbutyl)-phenyl]-cyclohexanecarboxylate,
2-cyano-4-n-hexylphenyl 4-trans-[4-(3-methylbutyl)-phenyl]-cyclohexanecarboxylate,
2-cyano-4-n-hexylphenyl 4-trans-[4-(2-methylheptyl)-phenyl]-cyclohexanecarboxylate,
2-cyano-4-n-heptylphenyl 4-trans-(4-methylphenyl)-cyclohexanecarboxylate,
2-cyano-4-n-heptylphenyl 4-trans-(4-ethylphenyl)-cyclohexanecarboxylate,
2-cyano-4-n-heptylphenyl 4-trans-(4-n-propylphenyl)-cyclohexanecarboxylate,
2-cyano-4-n-heptylphenyl 4-trans-(4-n-butylphenyl)-cyclohexanecarboxylate,
2-cyano-4-n-heptylphenyl 4-trans-(4-n-pentylphenyl)-cyclohexanecarboxylate, m.p. 73.5° C., Cl. 63.5° C.,
2-cyano-4-n-heptylphenyl 4-trans-(4-n-hexylphenyl)-cyclohexanecarboxylate,
2-cyano-4-n-heptylphenyl 4-trans-(4-n-heptylphenyl)-cyclohexanecarboxylate,
2-cyano-4-n-heptylphenyl 4-trans-(4-n-octylphenyl)-cyclohexanecarboxylate,
2-cyano-4-n-heptylphenyl 4-trans-(4-n-nonylphenyl)-cyclohexanecarboxylate,
2-cyano-4-n-heptylphenyl 4-trans-(4-n-decylphenyl)-cyclohexanecarboxylate,
2-cyano-4-n-heptylphenyl 4-trans-[4-(2-methylpropyl)-phenyl]-cyclohexanecarboxylate,
2-cyano-4-n-heptylphenyl 4-trans-[4-(2-methylbutyl)-phenyl]-cyclohexanecarboxylate,
2-cyano-4-n-heptylphenyl 4-trans-[4-(3-methylbutyl)-phenyl]-cyclohexanecarboxylate,
2-cyano-4-n-heptylphenyl 4-trans-[4-(2-methylheptyl)-phenyl]-cyclohexanecarboxylate,
2-cyano-4-n-octylphenyl 4-trans-(4-methylphenyl)-cyclohexanecarboxylate,
2-cyano-4-n-octylphenyl 4-trans-(4-ethylphenyl)-cyclohexanecarboxylate,
2-cyano-4-n-octylphenyl 4-trans-(4-n-propylphenyl)-cyclohexanecarboxylate,
2-cyano-4-n-octylphenyl 4-trans-(4-n-butylphenyl)-cyclohexanecarboxylate,
2-cyano-4-n-octylphenyl 4-trans-(4-n-pentylphenyl)-cyclohexanecarboxylate,
2-cyano-4-n-octylphenyl 4-trans-(4-n-hexylphenyl)-cyclohexanecarboxylate,
2-cyano-4-n-octylphenyl 4-trans-(4-n-heptylphenyl)-cyclohexanecarboxylate,
2-cyano-4-n-octylphenyl 4-trans-(4-n-octylphenyl)-cyclohexanecarboxylate,
2-cyano-4-n-octylphenyl 4-trans-(4-n-nonylphenyl)-cyclohexanecarboxylate,
2-cyano-4-n-octylphenyl 4-trans-(4-n-decylphenyl)-cyclohexanecarboxylate,
2-cyano-4-n-octylphenyl 4-trans-[4-(2-methylpropyl)-phenyl]-cyclohexanecarboxylate,
2-cyano-4-n-octylphenyl 4-trans-[4-(2-methylbutyl)-phenyl]-cyclohexanecarboxylate,
2-cyano-4-n-octylphenyl 4-trans-[4-(3-methylbutyl)-phenyl]-cyclohexanecarboxylate,
2-cyano-4-n-octylphenyl 4-trans-[2-methylheptyl)-phenyl]-cyclohexanecarboxylate,
2-cyano-4-n-nonylphenyl 4-trans-(4-methylphenyl)-cyclohexanecarboxylate,
2-cyano-4-n-nonylphenyl 4-trans-(4-ethylphenyl)-cyclohexanecarboxylate,
2-cyano-4-n-nonylphenyl 4-trans-(4-n-propylphenyl)-cyclohexanecarboxylate,
2-cyano-4-nonylphenyl 4-trans-(4-n-butylphenyl)-cyclohexanecarboxylate,
2-cyano-4-n-nonylphenyl 4-trans-(4-n-pentylphenyl)-cyclohexanecarboxylate,
2-cyano-4-n-nonylphenyl 4-trans-(4-n-hexylphenyl)-cyclohexanecarboxylate,
2-cyano-4-n-nonylphenyl 4-trans-(4-n-heptylphenyl)-cyclohexanecarboxylate,
2-cyano-4-n-nonylphenyl 4-trans-(4-n-octylphenyl)-cyclohexanecarboxylate,
2-cyano-4-n-nonylphenyl 4-trans-(4-n-nonylphenyl)-cyclohexanecarboxylate,
2-cyano-4-n-nonylphenyl 4-trans-(4-n-decylphenyl)-cyclohexanecarboxylate,
2-cyano-4-n-nonylphenyl 4-trans-[4-(2-methylpropyl)-phenyl]-cyclohexanecarboxylate,
2-cyano-4-n-nonylphenyl 4-trans-[4-(2-methylbutyl)-phenyl]-cyclohexanecarboxylate,
2-cyano-4-n-nonylphenyl 4-trans-[4-(3-methylbutyl)-phenyl]-cyclohexanecarboxylate,
2-cyano-4-n-nonylphenyl 4-trans-[4-(2-methylheptyl)-phenyl]-cyclohexanecarboxylate,
2-cyano-4-n-decylphenyl 4-trans-(4-methylphenyl)-cyclohexanecarboxylate,
2-cyano-4-n-decylphenyl 4-trans-(4-ethylphenyl)-cyclohexanecarboxylate,
2-cyano-4-n-decylphenyl 4-trans-(4-n-propylphenyl)-cyclohexanecarboxylate,
2-cyano-4-n-decylphenyl 4-trans-(4-n-butylphenyl)-cyclohexanecarboxylate,
2-cyano-4-n-decylphenyl 4-trans-(4-n-pentylphenyl)-cyclohexanecarboxylate,
2-cyano-4-n-decylphenyl 4-trans-(4-n-hexylphenyl)-cyclohexanecarboxylate,
2-cyano-4-n-decylphenyl 4-trans-(4-n-heptylphenyl)-cyclohexanecarboxylate,
2-cyano-4-n-decylphenyl 4-trans-(4-n-octylphenyl)-cyclohexanecarboxylate,
2-cyano-4-n-decylphenyl 4-trans-(4-n-nonylphenyl)-cyclohexanecarboxylate,
2-cyano-4-n-decylphenyl 4-trans-(4-n-decylphenyl)-cyclohexanecarboxylate,
2-cyano-4-n-decylphenyl 4-trans-[4-(2-methylpropyl)-phenyl]-cyclohexanecarboxylate,
2-cyano-4-n-decylphenyl 4-trans-[4-(2-methylbutyl)-phenyl]-cyclohexanecarboxylate,
2-cyano-4-n-decylphenyl 4-trans-[4-(3-methylbutyl)-phenyl]-cyclohexanecarboxylate,
2-cyano-4-n-decylphenyl 4-trans-[4-(2-methylheptyl)-phenyl]-cyclohexanecarboxylate,
2-cyano-4-(2-methylbutyl)-phenyl 4-trans-(4-methylphenyl)-cyclohexanecarboxylate, 2-cyano-4-(2-methylbutyl)-phenyl 4-trans-(4-ethyl-phenyl)-cyclohexanecarboxylate,
2-cyano-4-(2-methylbutyl)-phenyl 4-trans-(4-n-propyl-phenyl)-cyclohexanecarboxylate,
2-cyano-4-(2-methylbutyl)-phenyl 4-trans-(4-n-butyl-phenyl)-cyclohexanecarboxylate,
2-cyano-4-(2-methylbutyl)-phenyl 4-trans-(4-n-pentyl-phenyl)-cyclohexanecarboxylate,
2-cyano-4-(2-methylbutyl)-phenyl 4-trans-(4-n-hexyl-phenyl)-cyclohexanecarboxylate,
2-cyano-4-(2-methylbutyl)-phenyl 4-trans-(4-n-heptyl-phenyl)-cyclohexanecarboxylate,
2-cyano-4-(2-methylbutyl)-phenyl 4-trans-(4-n-octyl-phenyl)-cyclohexanecarboxylate,
2-cyano-4-(2-methylbutyl)-phenyl 4-trans-(4-n-nonyl-phenyl)-cyclohexanecarboxylate,
2-cyano-4-(2-methylbutyl)-phenyl 4-trans-(4-n-decyl-phenyl)-cyclohexanecarboxylate,
2-cyano-4-(3-methylbutyl)-phenyl 4-trans-(4-methyl-phenyl)-cyclohexanecarboxylate,
2-cyano-4-(3-methylbutyl)-phenyl 4-trans-(4-ethyl-phenyl)-cyclohexanecarboxylate,
2-cyano-4-(3-methylbutyl)-phenyl 4-trans-(4-n-propyl-phenyl)-cyclohexanecarboxylate,
2-cyano-4-(3-methylbutyl)-phenyl 4-trans-(4-n-butyl-phenyl)-cyclohexanecarboxylate,
2-cyano-4-(3-methylbutyl)-phenyl 4-trans-(4-n-pentyl-phenyl)-cyclohexanecarboxylate,
2-cyano-4-(3-methylbutyl)-phenyl 4-trans-(4-n-hexyl-phenyl)-cyclohexanecarboxylate,
2-cyano-4-(3-methylbutyl)-phenyl 4-trans-(4-n-heptyl-phenyl)-cyclohexanecarboxylate,
2-cyano-4-(3-methylbutyl)-phenyl 4-trans-(4-n-octyl-phenyl)-cyclohexanecarboxylate,
2-cyano-4-(3-methylbutyl)-phenyl 4-trans-(4-n-nonyl-phenyl)-cyclohexanecarboxylate,
2-cyano-4-(3-methylbutyl)-phenyl 4-trans-(4-n-decyl-phenyl)-cyclohexanecarboxylate,
2-cyano-4-(2-ethylhexyl)-phenyl 4-trans-(4-methyl-phenyl)-cyclohexanecarboxylate,
2-cyano-4-(2-ethylhexyl)-phenyl 4-trans-(4-ethyl-phenyl)-cyclohexanecarboxylate,
2-cyano-4-(2-ethylhexyl)-phenyl 4-trans-(4-n-propyl-phenyl)-cyclohexanecarboxylate,
2-cyano-4-(2-ethylhexyl)-phenyl 4-trans-(4-n-butyl-phenyl)-cyclohexanecarboxylate,
2-cyano-4-(2-ethylhexyl)-phenyl 4-trans-(4-n-pentyl-phenyl)-cyclohexanecarboxylate,
2-cyano-4-(2-ethylhexyl)-phenyl 4-trans-(4-n-hexyl-phenyl)-cyclohexanecarboxylate,
2-cyano-4-(2-ethylhexyl)-phenyl 4-trans-(4-n-heptyl-phenyl)-cyclohexanecarboxylate,
2-cyano-4-(2-ethylhexyl)-phenyl 4-trans-(4-n-octyl-phenyl)-cyclohexanecarboxylate,
2-cyano-4-(2-ethylhexyl)-phenyl 4-trans-(4-n-nonyl-phenyl)-cyclohexanecarboxylate,
2-cyano-4-(2-ethylhexyl)-phenyl 4-trans-(4-n-decyl-phenyl)-cyclohexanecarboxylate,
2-cyano-4-(1-methylheptyl)-phenyl 4-trans-(4-methyl-phenyl)-cyclohexanecarboxylate,
2-cyano-4-(1-methylheptyl)-phenyl 4-trans-(4-ethyl-phenyl)-cyclohexanecarboxylate,
2-cyano-4-(1-methylheptyl)-phenyl 4-trans-(4-n-propyl-phenyl)-cyclohexanecarboxylate,
2-cyano-4-(1-methylheptyl)-phenyl 4-trans-(4-n-butyl-phenyl)-cyclohexanecarboxylate,
2-cyano-4-(1-methylheptyl)-phenyl 4-trans-(4-n-pentyl-phenyl)-cyclohexanecarboxylate,
2-cyano-4-(1-methylheptyl)-phenyl 4-trans-(4-n-hexyl-phenyl)-cyclohexanecarboxylate,
2-cyano-4-(1-methylheptyl)-phenyl 4-trans-(4-n-heptyl-phenyl)-cyclohexanecarboxylate,
2-cyano-4-(1-methylheptyl)-phenyl 4-trans-(4-n-octyl-phenyl)-cyclohexanecarboxylate,
2-cyano-4-(1-methylheptyl)-phenyl 4-trans-(4-n-nonyl-phenyl)-cyclohexanecarboxylate,
2-cyano-4-(1-methylheptyl)-phenyl 4-trans-(4-n-decyl-phenyl)-cyclohexanecarboxylate,
2-cyano-4-(2-methylhexyl)-phenyl 4-trans-(4-methyl-phenyl)-cyclohexanecarboxylate,
2-cyano-4-(2-methylhexyl)-phenyl 4-trans-(4-ethyl-phenyl)-cyclohexanecarboxylate,
2-cyano-4-(2-methylhexyl)-phenyl 4-trans-(4-n-propyl-phenyl)-cyclohexanecarboxylate,
2-cyano-4-(2-methylhexyl)-phenyl 4-trans-(4-n-butyl-phenyl)-cyclohexanecarboxylate,
2-cyano-4-(2-methylhexyl)-phenyl 4-trans-(4-n-pentyl-phenyl)-cyclohexanecarboxylate,
2-cyano-4-(2-methylhexyl)-phenyl 4-trans-(4-n-hexyl-phenyl)-cyclohexanecarboxylate,
2-cyano-4-(2-methylhexyl)-phenyl 4-trans-(4-n-heptyl-phenyl)-cyclohexanecarboxylate,
2-cyano-4-(2-methylhexyl)-phenyl 4-trans-(4-n-octyl-phenyl)-cyclohexanecarboxylate,
2-cyano-4-(2-methylhexyl)-phenyl 4-trans-(4-n-nonyl-phenyl)-cyclohexanecarboxylate and
2-cyano-4-(2-methylhexyl)-phenyl 4-trans-(4-n-decyl-phenyl)-cyclohexanecarboxylate.

EXAMPLE 3

The liquid crystal base mixture consisting of 33% of 4-ethyl-4'-methoxyazoxybenzene and 67% of 4-n-butyl-4'-methoxyazoxybenzene has a m.p. of −5° C., a Cl. of 73° C. and a DCA of −0.25.

2-Cyano-4-n-heptylphenyl 4-(trans-4-n-pentylcyclohexyl)-benzoate is soluble in this base mixture to the extent of 31% (based on the total mixture). The resulting liquid crystal dielectric has a m.p. of −15° C., a Cl. of 84° C. and a DCA of −1.5.

The analogous 2-cyano-4-n-heptylphenyl 4-(4-n-pentylphenyl)-benzoate (German Offenlegungsschrift No. 2,613,293), in contrast, is soluble in the same base mixture only to the extent of 15%; the resulting dielectric has a narrower temperature range for the nematic phase (m.p. −9° C., Cl. 77° C.) and a smaller negative DCA of −0.8.

EXAMPLE 4

The liquid crystal base mixture consisting of 67% of 4-n-pentylphenyl anisate and 33% of 4-n-pentylphenyl 4-trans-n-hexyloxybenzoate has a m.p. of 11° C., a Cl. of 49° C. and a DCA of +0.1.

2-Cyano-4-n-pentylphenyl 4-(trans-4-n-pentylcyclohexyl)-benzoate is soluble in this base mixture to the extent of 38% (based on the total mixture). The resulting dielectric has a m.p. of −4° C., a Cl. of 72° C. and a DCA of −1.3.

The isomeric compound 2-cyano-4-n-pentylphenyl 4-(4-n-pentylphenyl)-trans-cyclohexanecarboxylate is soluble in the same base mixture to the extent of 28%. The resulting dielectric has a m.p. of 0° C., a Cl. of 49° C. and a DCA of −0.9.

In contrast, only 8% of the analogous 2-cyano-4-n-pentylphenyl 4-(4-n-pentylphenyl)-benzoate (German Offenlegungsschrift No. 2,613,293) can be dissolved in this base mixture; the resulting dielectric has a narrower temperature range for the nematic phase (m.p. 8° C., Cl. 53° C.) and a DCA of only −0.2.

EXAMPLE 5

The liquid crystal base mixture consisting of 61% of N-(4-methoxybenzylidene)-4-n-butylaniline and 39% of N-(4-ethoxybenzylidene)-4-n-butylaniline has a m.p. of −5° C., a Cl. of 59° C. and a DCA of −0.5.

2-Cyano-4-n-butylphenyl 4-(trans-4-n-propylcyclohexyl)-benzoate is soluble in this base mixture to the extent of 28% (based on the total mixture). The resulting liquid crystal dielectric has a m.p. of −14° C., a Cl. of 72° C. and a DCA of −1.4.

10% of the similar 2-cyano-4-n-pentylphenyl 4-(4-n-propylphenyl)-benzoate, according to German Offenlegungsschrift No. 2,613,293, can be dissolved in the same base mixture, providing a dielectric with a narrower temperature range for the nematic phase (m.p. −8° C., Cl. 64° C.) and a DCA of only −0.8.

EXAMPLE 6

The liquid crystal base mixture consisting of 72% of 4-n-propyl-1-(4-n-butyryloxyphenyl)-trans-cyclohexane and 38% of trans-4-n-propylcyclohexyl 4-(trans-4-n-butylcyclohexyl)-benzoate has a m.p. of 3° C., a Cl. of 63° C. and a DCA of −0.7. A liquid crystal dielectric with a m.p. of −7° C., a Cl. of +75° C. and a DCA of −1.3 is obtained from 70% of this base mixture and 30% of 2-cyano-4-n-butylphenyl 4-(trans-4-n-propylcyclohexyl)-benzoate.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A liquid crystalline carboxylic acid ester of the formula

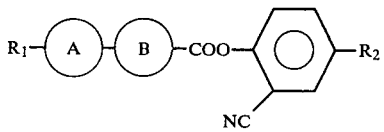

in which one of A or B is 1,4-disubstituted phenyl and the other is trans-1,4-disubstituted cyclohexane and $R_1$ and $R_2$ are independently each alkyl of 1–10 carbon atoms.

2. A liquid crystalline carboxylic acid ester of claim 1 of the formula

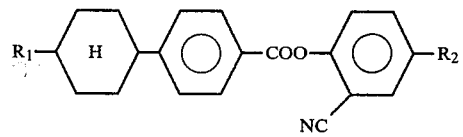

3. A liquid crystalline carboxylic acid ester of claim 1 of the formula

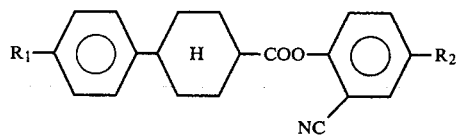

4. A liquid crystalline carboxylic acid ester of claim 1 wherein at least one of $R_1$ and $R_2$ is straight-chain alkyl and the total number of carbon atoms in $R_1$ and $R_2$ is 5–14 carbon atoms.

5. In a liquid crystalline dielectric comprising two liquid crystal components, the improvement wherein at least one component is a compound of claim 1.

6. A liquid crystalline dielectric comprising 1–50% by weight of a compound of claim 1, and also a second liquid crystalline component.

7. The liquid crystalline dielectric of claim 5 containing a liquid crystalline compound of the formula

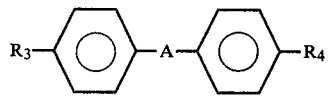

wherein A is —CH=CH—, —CH=CX—, —CX=CH—, —C≡C—, —N=N—, —N(O)=N—, —N=N(O)—, —CO—O—, —O—CO—, —CO—S—, —S—CO—, —CH=N—, —N=CH—, —CH=N(O)—, —N(O)=CH— or a C—C single bond; when A is —CO—O—, —O—CO— or a C—C single bond, one of the two phenyl rings can be replaced by a trans-1,4-disubstituted cyclohexane ring; X is CN or halogen; $R_3$ and $R_4$ are identical or different and are each alkyl, alkoxy, alkanoyl, alkanoyloxy or alkoxycarbonyloxy of up to 18 carbon atoms, and one of $R_3$ and $R_4$ can also be —CN, —NC or —NO$_2$.

8. In an electrooptical display element comprising a liquid crystalline cell having a liquid crystalline dielectric, the improvement wherein the dielectric is that of claim 5.

* * * * *